United States Patent
Gong et al.

(10) Patent No.: US 9,912,560 B2
(45) Date of Patent: Mar. 6, 2018

(54) METHOD AND DEVICE FOR CHECKING HEALTH OF LINK

(71) Applicant: BEIJING BAIDU NETCOM SCIENCE AND TECHNOLOGY CO., LTD., Beijing (CN)

(72) Inventors: Zhi Gong, Beijing (CN); Peng Huang, Beijing (CN); Chang Hou, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 14/899,479

(22) PCT Filed: Dec. 10, 2014

(86) PCT No.: PCT/CN2014/093518
§ 371 (c)(1),
(2) Date: Dec. 17, 2015

(87) PCT Pub. No.: WO2016/065700
PCT Pub. Date: May 6, 2016

(65) Prior Publication Data
US 2017/0230261 A1    Aug. 10, 2017

(30) Foreign Application Priority Data

Oct. 31, 2014    (CN) .......................... 2014 1 0602750

(51) Int. Cl.
*G06F 15/173*    (2006.01)
*H04L 12/26*    (2006.01)

(52) U.S. Cl.
CPC .......... *H04L 43/0811* (2013.01); *H04L 43/10* (2013.01)

(58) Field of Classification Search
CPC .............................. H04L 43/0811; H04L 43/10
(Continued)

(56) References Cited

U.S. PATENT DOCUMENTS 7,496,659 B1*  2/2009  Coverdill ............ H04L 43/0811
                                                        370/252
7,921,686 B2*  4/2011  Bagepalli .............. H04L 63/166
                                                        370/352
(Continued)

FOREIGN PATENT DOCUMENTS

CN    101640620    2/2010
CN    101729312    6/2010
(Continued)

OTHER PUBLICATIONS

Sun Quan, On Parameter Settings of Network Keep-Alive Protocol For Failure Detection, Proceedings of 1C-BNMT2009, 2009.
(Continued)

*Primary Examiner* — Tauqir Hussain
(74) *Attorney, Agent, or Firm* — Hodgson Russ LLP

(57) ABSTRACT

A method and a device for checking health of a link are disclosed in the present disclosure. The method includes: receiving and saving control information generated by a keep-alive program; performing a matching on a message received according to the control information, processing the message if the matching is successful, and sending a processed message to the server to be checked; and determining that the link is healthy if a response message is received from the server to be checked, and determining that the link is unhealthy if no response message r is received from the server to be checked. With embodiments of the present disclosure, control information generated by the keep-alive program is received and saved, a matching is performed on a received message according to the control information, and the message is processed if the matching is successful, and then the processed message is sent to a server to be checked, such that whether a link corresponding to the server to be checked is healthy is checked. The above procedure is in accordance with the procedure of accessing
(Continued)

| destination MAC address | IP TUNNEL | destination IP address | message data | the LVS, and thus the problem of traffic loss or mistakenly rejecting the server may be solved and the accuracy of checking health may be improved.

6 Claims, 3 Drawing Sheets

(58) Field of Classification Search
USPC ........................................................ 709/224
See application file for complete search history.

(56) References Cited

U.S. PATENT DOCUMENTS

| | | | | |
|---|---|---|---|---|
| 8,874,761 | B2* | 10/2014 | Backholm | H04L 65/4084 455/408 |
| 2008/0031265 | A1* | 2/2008 | Mullick | H04L 12/4641 370/401 |
| 2010/0232439 | A1* | 9/2010 | Dham | H04L 29/12528 370/401 |
| 2012/0076099 | A1* | 3/2012 | Yin | H04L 12/4633 370/329 |
| 2013/0159395 | A1* | 6/2013 | Backholm | H04L 29/08099 709/203 |

FOREIGN PATENT DOCUMENTS

| | | |
|---|---|---|
| CN | 102810111 | 12/2012 |
| CN | 103973424 | 8/2014 |
| EP | 2230822 | 9/2010 |

OTHER PUBLICATIONS

International Searching Authority, International Search Report for PCT/CN2014/093518 dated Aug. 5, 2015.

* cited by examiner

METHOD AND DEVICE FOR CHECKING HEALTH OF LINK

CROSS-REFERENCE TO RELATED APPLICATION

This application claims priority to and benefits of Chinese Patent Application Serial No. 201410602750.6, filed with the State Intellectual Property Office of P. R. China on Oct. 31, 2014, which is entitled as "method and device for checking health of link" and submitted by BAIDU NETCOM SCIENCE AND TECHNOLOGY CO., LTD., the entire content of which is incorporated herein by reference.

FIELD

The present disclosure relates to computer network technology, and more particularly to a method and a device for checking health of a link.

BACKGROUND

LVS is an abbreviation of Linux (an open source operating system) Virtual Server, which is a virtual server cluster system. The LVS mainly includes a load balancer and back-end servers. The load balancer is a front-end part of the cluster system, and configured to send a request from a client to the back-end server. The back-end servers are a group of servers performing the request of the client.

Currently, the load balancer generally checks health of the back-end server via Keepalived program (a keep-alive program).

However, when the keep-alive program checks health of the back-end server, a health checking packet is sent to the back-end server directly through an internal network IP address of the load balancer, such that it is hard to determine whether the client and the back-end server are normal, and thus a large traffic loss or mistakenly rejecting the back-end server may be caused.

SUMMARY

The present disclosure aims to solve at least one of the above problems to some extent. Therefore, a first objective of the present disclosure is to propose a method for checking health of a link, a procedure of which is in accordance with that of accessing the LVS, and thus the problem of traffic loss or mistakenly rejecting the back-end server may be solved and the accuracy of checking health may be improved.

A second objective of the present disclosure is to propose a device for checking health of a link.

To realize the above objectives, according to a first aspect of embodiments of the present disclosure, there is provided a method for checking health of a link, including: receiving and saving control information generated by a keep-alive program, in which the control information includes a source Internet Protocol IP address, a source port, a destination IP address, a destination port, an IP address of a server to be checked, and mode information; performing a matching on a message received according to the control information, processing the message if the matching is successful, and sending a processed message to the server to be checked; and determining that the link is healthy if a response message is received from the server to be checked, and determining that the link is unhealthy if no response message is received from the server to be checked.

With the method for checking health of a link according to embodiments of the present disclosure, control information generated by the keep-alive program is received and saved, a matching is performed on a received message according to the control information, and the message is processed if the matching is successful, and then the processed message is sent to a server to be checked, such that whether the link corresponding to the server to be checked is healthy is checked. The procedure of the above method is in accordance with the procedure of accessing the LVS, and thus the problem of traffic loss or mistakenly rejecting the back-end server may be solved and the accuracy of checking health may be improved.

To realize the above objectives, according to a second aspect of embodiments of the present disclosure, there is provided a device for checking health of a link, including: a receiving module, configured to receive and save control information generated by a keep-alive program, in which the control information includes a source Internet Protocol IP address, a source port, a destination IP address, a destination port, an IP address of a server to be checked, and mode information; a processing module, configured to perform a matching on a message received according to the control information, process the message if the matching is successful, and send a processed message to the server to be checked; and a determining module, configured to determine that the link is healthy if a response message is received from the server to be checked, and determine that the link is unhealthy if no response message is received from the server to be checked.

With the device for checking health of a link according to embodiments of the present disclosure, control information generated by the Keep-alive program is received and saved, a matching is performed on a received message according to the control information, and the message is processed if the matching is successful, and then the processed message is sent to a server to be checked, such that whether a link corresponding to the server to be checked is healthy is checked. The above procedure is in accordance with the procedure of accessing the LVS, and thus the problem of traffic loss or mistakenly rejecting the back-end server may be solved and the accuracy of checking health may be improved.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the accompanying drawings, in which.

DETAILED DESCRIPTION

Figure 1:
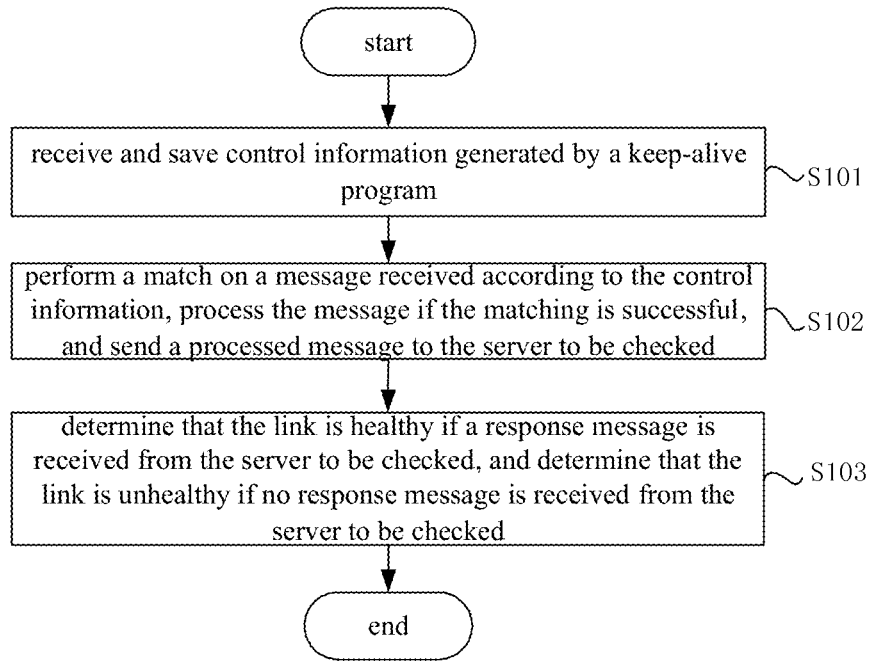
FIG. 1 is a flow chart of a method for checking health of a link according to an embodiment.

Reference will be made in detail to embodiments of the present disclosure. Embodiments of the present disclosure will be shown in drawings, in which the same or similar elements and the elements having same or similar functions are denoted by like reference numerals throughout the descriptions. The embodiments described herein according to drawings are explanatory and illustrative, not construed to limit the present disclosure.

The method and device for checking health of a link according to embodiments of the present disclosure will be described with reference to drawings.

FIG. 1 is a flow chart of a method for checking health of a link according to an example embodiment, which is described from a system kernel side of a load balancer.

As shown in FIG. 1, the method for checking health of a link includes the following steps.

In step S101, control information generated by a keep-alive program is received and saved.

In the present disclosure, the system kernel may receive and save control information generated by a keep-alive program, for example, Keepalived program, in which the control information includes a source IP address, a source port, a destination IP address, a destination port, an IP address of a server to be checked, and mode information. The mode information may be a Direct Routing DR mode or a Tunnel TUN mode.

Specifically, the keep-alive program may call a first preset function such as a bind function to set the source IP address and the source port. For example, the source IP address may be set as a local IP address, and the source port may be set as 0. Then, the destination IP address may be set as a virtual IP address of the load balancer, and the destination port is set by calling a second preset function. For example, a connect function is called, such that the destination port is set as a virtual IP address of the load balancer, and the destination port is set as VPORT.

After generating the control information, a getsockname function (function for getting socket name) may be called by the keep-alive program to obtain the number of the source port, and then a setsockopt function (function for setting socket options) is called to send the control information to the system kernel. The system kernel may be a Linux system kernel. After receiving the control information, the system kernel saves the control information.

In step S102, a matching is performed on a message received according to the control information, and if the matching is successful, the message is processed, and a processed message is sent to the server to be checked.

In an embodiment of the present disclosure, the system kernel may perform the matching on the message received according to the control information.

Specifically, the system kernel may determine whether the matching is successful by determining whether the source IP address, the source port, the destination IP address, and the destination IP port in the control information are respectively identical with a source IP address, a source port, a destination IP address, and a destination IP port in the message received.

Then, the system kernel may process the message if the matching is successful.

Figure 2:
FIG. 2 is a schematic diagram illustrating a message structure according to an embodiment.

Specifically, if the mode information is determined as the DR mode, a destination MAC address of the message is amended to the MAC address of the server to be checked. As shown in FIG. 2, in the structure of the message, the destination IP address is added before the message data, and the destination MAC address is added before the destination IP address. In embodiments of the present disclosure, if the mode information is the DR mode, the destination MAC address before the message data may be amended as the MAC address of the server to be checked.

Figure 3:
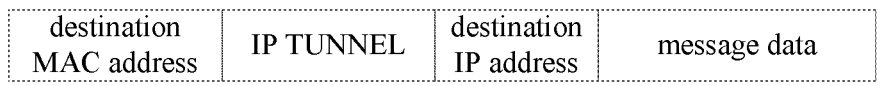
FIG. 3 is a schematic diagram illustrating another message structure according to an embodiment.

If the mode information is determined as the TUN mode, a TUNNEL head is added before the destination IP address of the message. As shown in FIG. 3, in the structure of the message, the destination IP address is added before the message data, and the destination MAC address is added before the destination IP address. In embodiments of the present disclosure, if the mode information is TUN mode, the TUNNEL head may be added before the destination IP address of the message.

After processing the message which is successfully matched, the processed message may be sent to the server to be checked.

In step S103, it is determined that the link is healthy if a response message is received from the server to be checked, and it is determined that the link is unhealthy if no response message is received from the server to be checked.

It may be determined that the link is unhealthy in following two cases: the link is not connected physically; the link is connected physically but cannot receive a health response packet.

In embodiments of the present disclosure, it is determined that the link is healthy if the system kernel receives a response message returned from the server to be checked, and it is determined that the link is unhealthy if the system kernel does not receive a response message returned from the server to be checked.

With the method for checking health of a link according to embodiments of the present disclosure, control information generated by the keep-alive program is received and saved, a matching is performed on a received message according to the control information, and the message is processed if the matching is successful, and then the processed message is sent to a server to be checked, such that whether a link corresponding to the server to be checked is healthy is checked. The procedure of the above method is in accordance with the procedure of accessing the LVS, and thus the problem of traffic loss or mistakenly rejecting the server may be solved and the accuracy of checking health may be improved.

Figure 4:
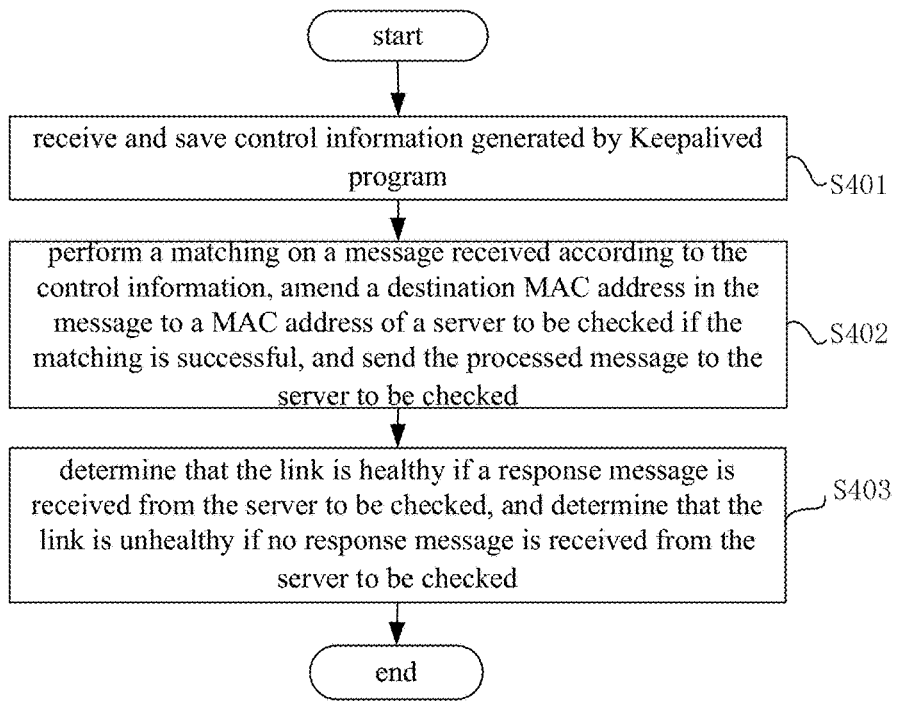
FIG. 4 is a flow chart of a method for checking health of a link according to an example embodiment.

FIG. 4 is a flow chart of a method for checking health of a link according to an example embodiment. In the present embodiment, description is made taking the current working mode being the DR mode as an example.

First, a procedure of accessing the LVS in the DR mode is introduced.

When the LVS is in the DR mode, steps of processing a request of the user are described as follows.

1. The client sends a request packet to a virtual IP address of a load balancer (LINUX system kernel).
2. The load balancer receives and analyzes the request packet, converts the destination MAC address in the request packet to a MAC address of a server, and sends the request packet to the server.
3. The local loop interface of the server is bound to virtual IP address of the load balancer, the server receives and processes the request packet, and then generates a response packet and returns the response packet to the client directly via another router.

The procedure of the method for checking health of a link in the present embodiment is in accordance with the procedure of accessing the LVS by a user, thus checking whether the link is healthy accurately.

Specifically, as shown in FIG. 4, the method for checking health of a link includes the following steps.

In step S401, control information generated by a keepalive program is received and saved.

Specifically, the Keepalived program may use a bind function to call a source IP address of a bound socket, in which the source IP address is assumed as 10.76.1.1 and the source port is 0, and then call a getsockname function (function for getting socket name) to obtain the port number of the bound socket, so as to generate the control information, in which the control information may include the source IP address, the source port, a VIP address (virtual IP address of the load balancer), a VPORT (virtual IP port of the load balancer), an IP address of a server to be checked and mode information etc. Then, the control information generated by the Keepalived program is received and saved by the load balancer (LINUX system kernel).

In step 402, a matching is performed on a message received according to the control information, and if the matching is successful, a destination MAC address of the message is amended to a MAC address of a server to be checked, and the processed message is sent to the server to be checked.

Specifically, a hook function may be called through a network filter frame (netfilter) at a local outlet (LOCAL_OUT), so as to detect message. If the message is determined as a healthy checking message, the destination MAC address in the message is amended as a MAC address of the server to be checked, and then the processed message is sent to the server to be checked.

In step S403, it is determined that the link is healthy if a response message is received from the server to be checked, and it is determined that the link is unhealthy if no response message is received from the server to be checked.

Specifically, if a response message is received from the server to be checked, a hook function may be called through a network filter frame (netfilter) at a predetermined router (PRE_ROUTING), so as to detect the response message. If the response message is determined to be a message returned by the server to be checked, the corresponding link is determined to be healthy.

With the method for checking health of a link according to embodiments of the present disclosure, control information generated by the Keepalived program is received and saved, a matching is performed on a received message according to the control information, and if the matching is successful, the destination MAC address in the message is amended to the MAC address of the server to be checked, and then the processed message is sent to the server to be checked, such that whether a link corresponding to the server to be checked is healthy is checked. The above procedure is in accordance with the procedure of accessing the LVS, and thus a problem of traffic loss, which is caused when the client cannot access the server to be checked and the health of the server to be checked is detected via the intranet IP, can be solved, and a situation of mistakenly rejecting the healthy server, which is caused when the client can access the server to be checked but the link connected with the server to be checked via the intranet IP is unhealthy, can be avoided.

Figure 5:
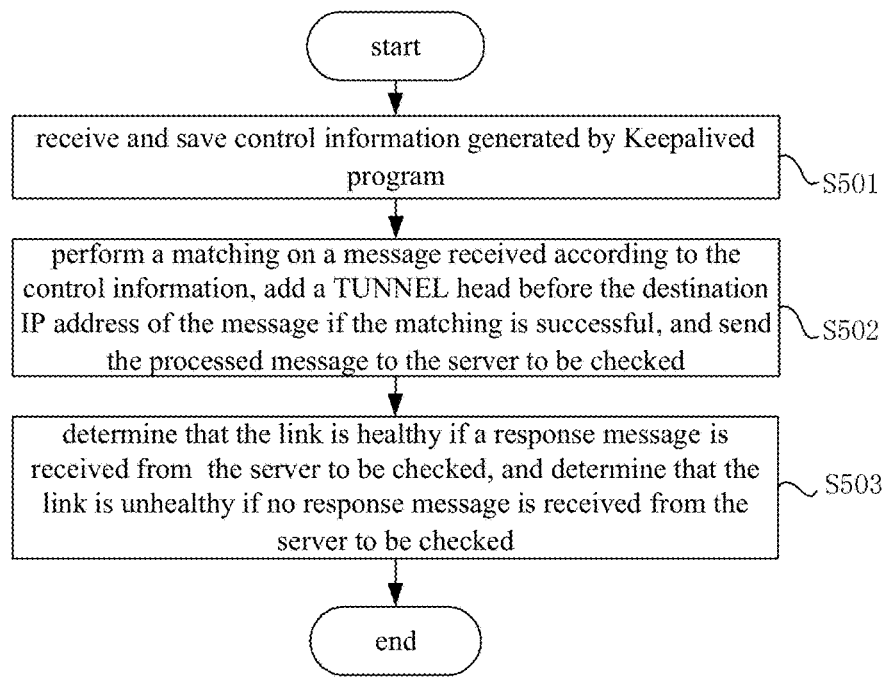
FIG. 5 is a flow chart of a method for checking health of a link according to another example embodiment.

FIG. 5 is a flow chart of a method for checking health of a link according to another example embodiment. In the present embodiment, description is made taking the current working mode being the TUN mode as an example.

First, a procedure of accessing the LVS in the TUN mode is introduced.

When the LVS is in the TUN mode, steps of processing a request of the user are described as follows.

1. The client sends a request packet to a virtual IP address of a load balancer (LINUX system kernel).
2. The load balancer receives the request packet, encapsulates the request packet according to a tunnel protocol, and sends the request packet to the server.
3. The server receives and processes the request packet, and then generates a response packet and returns the response packet to the client.

The procedure of the method for checking health of a link in the present embodiment is in accordance with the procedure of accessing the LVS by a user, thus checking whether the link is healthy accurately.

Specifically, as shown in FIG. 5, the method for checking health of a link includes the following steps.

In step S501, control information generated by Keepalived program is received and saved.

Specifically, the Keepalived program may use a bind function to call a source IP address of a bound socket, in which the source IP address is assumed as 10.76.1.1 and the source port is 0, and then call a getsockname function (function for getting socket name) to obtain the port number of the bound socket, so as to generate the control information, in which the control information may include the source IP address, the source port, a VIP address (virtual IP address of the load balancer), a VPORT (virtual IP port of the load balancer), an IP address of a server to be checked and mode information etc. Then, the control information generated by the Keepalived program is received and saved by the load balancer (LINUX system kernel).

In step S502, a matching is performed on a message received according to the control information, and if the matching is successful, a TUNNEL head is added before the destination IP address of the message, and the processed message is sent to the server to be checked.

Specifically, a hook function may be called through a network filter frame (netfilter) at a local outlet (LOCAL_OUT), so as to detect message. If the message is determined as a message for health checking, a TUNNEL head is added before the destination IP address of the message, and then the processed message is sent to the server to be checked.

In step S503, it is determined that the link is healthy if a response message is received from the server to be checked, and it is determined that the link is unhealthy if no response message is received from the server to be checked.

Specifically, if a response message is received from the server to be checked, a hook function may be called through a network filter frame (netfilter) at a predetermined router (PRE_ROUTING), so as to detect the response message. If the response message is determined to be a message returned by the server to be checked, the corresponding link is determined to be healthy.

With the method for checking health of a link according to embodiments of the present disclosure, control information generated by the Keepalived program is received and saved, a matching is performed on a received message according to the control information, and if the matching is successful, the TUNNEL head is added before the destination IP address of the message, and then the processed message is sent to the server to be checked, such that whether a link corresponding to the server to be checked is healthy is checked. The above procedure is in accordance with the procedure of accessing the LVS, and thus a problem of traffic loss, which is caused when the client cannot access the server to be checked and the health of the server to be checked is detected via the intranet IP, can be solved, and a situation of mistakenly rejecting the healthy server, which is caused when the client can access the server to be checked but the link connected with the server to be checked via the intranet IP is unhealthy, can be avoided.

To realize the above embodiments, a device for checking health of a link is also provided in the present disclosure.

Figure 6:
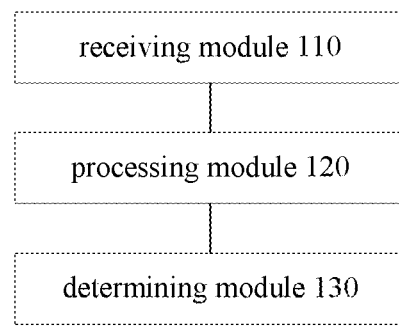
FIG. 6 is a block diagram of a device for checking health of a link according to an embodiment.

FIG. 6 is a block diagram of a device for checking health of a link according to an embodiment of the present disclosure.

As shown in FIG. 6, the device for checking health of a link includes: a receiving module 110, a processing module 120 and a determining module 130.

The receiving module 110 is configured to receive and save control information generated by a keep-alive program.

In embodiments of the present disclosure, the receiving module 110 may receive and save control information generated by a keep-alive program such as keepalived program, in which the control information comprises a source IP address, a source port, a destination IP address, a destination port, an IP address of a server to be checked, and mode information. The mode information may be a DR mode or a TUN mode.

Specifically, the keep-alive program may call a first preset function such as a bind function to set the source IP address and the source port. For example, the source IP address may be set as a local IP address, and the source port may be set as 0. Then, the destination IP address may be set as a virtual IP address of the load balancer, and the destination port is set by calling a second preset function. For example, a connect function is called, such that the destination port is set as a virtual IP address of the load balancer, and the destination port is set as VPORT.

After generating the control information, a getsockname function (function for getting socket name) may be called by the keep-alive program to obtain the number of the source port, and then a setsockopt function (function for setting socket options) is called to send the control information to the receiving module 110 in the system kernel. The system kernel may be a Linux system kernel. After receiving the control information, the receiving module 110 saves the control information.

The processing module 120 is configured to perform a matching on a message received according to the control information, process the message if the matching is successful, and send a processed message to the server to be checked.

In an embodiment of the present disclosure, the processing module 120 may perform the matching on the message received according to the control information.

Specifically, the processing module 120 may determine whether the matching is successful by determining whether the source IP address, the source port, the destination IP address, and the destination IP port in the control information are respectively identical with a source IP address, a source port, a destination IP address, and a destination IP port in the message received, and if yes, determine that the matching is successful.

Then, the processing module 120 may process the message which is successfully matched.

Specifically, if the mode information is determined as the DR mode, a destination MAC address of the message is amended by the processing module 120 to the MAC address of the server to be checked. As shown in FIG. 2, in the structure of the message, the destination IP address is added before the message data, and the destination MAC address is added before the destination IP address. In embodiments of the present disclosure, if the mode information is the DR mode, the destination MAC address before the message data may be amended as the MAC address of the server to be checked.

If the mode information is determined as the TUN mode, a TUNNEL head is added by the processing module 120 before the destination IP address of the message. As shown in FIG. 3, in the structure of the message, the destination IP address is added before the message data, and the destination MAC address is added before the destination IP address. In embodiments of the present disclosure, if the mode information is TUN mode, the TUNNEL head may be added before the destination IP address of the message.

After processing the message which is successfully matched, the processed message may be sent by the processing module 120 to the server to be checked.

The determining module 130 is configured to determine that the link is healthy if a response message is received from the server to be checked, and determine that the link is unhealthy if no response message is received from the server to be checked.

It may be determined that the link is unhealthy in following two cases: the link is not connected physically; the link is connected physically but cannot receive a health response packet.

In embodiments of the present disclosure, the determining module 130 may determine that the link is healthy if the system kernel receives a response message returned from the server to be checked, and determine that the link is unhealthy if the system kernel does not receive a response message returned from the server to be checked.

With the device for checking health of a link according to embodiments of the present disclosure, control information generated by the keep-alive program is received and saved, a matching is performed on a received message according to the control information, and if the matching is successful, the message is processed, and then the processed message is sent to a server to be checked, such that whether a link corresponding to the server to be checked is healthy is checked. The procedure in the device is in accordance with that of accessing the LVS, thus solving the problem of traffic loss or mistakenly rejecting the server and improving the accuracy of checking health.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

In addition, terms such as "first" and "second" are used herein for purposes of description and are not intended to indicate or imply relative importance or significance. Thus, the feature defined with "first" and "second" may include one or more this feature. In the description of the present disclosure, "a plurality of" means two or more than two, unless specified otherwise.

It will be understood that, the flow chart or any process or method described herein in other manners may represent a module, segment, or portion of code that includes one or more executable instructions to implement the specified logic function(s) or that includes one or more executable instructions of the steps of the progress. Although the flow chart shows a specific order of execution, it is understood that the order of execution may differ from that which is depicted. It is understood that all such variations are within the scope of the present disclosure. Also, the flow chart is relatively self-explanatory and is understood by those skilled in the art to the extent that software and/or hardware can be created by one with ordinary skill in the art to carry out the various logical functions as described herein.

The logic and step described in the flow chart or in other manners, for example, a scheduling list of an executable instruction to implement the specified logic function(s), it can be embodied in any computer-readable medium for use by or in connection with an instruction execution system such as, for example, a processor in a computer system or other system. In this sense, the logic may include, for example, statements including instructions and declarations that can be fetched from the computer-readable medium and executed by the instruction execution system. In the context of the present disclosure, a "computer-readable medium" can be any medium that can contain, store, or maintain the printer registrar for use by or in connection with the instruction execution system. The computer readable medium can include any one of many physical media such as, for example, electronic, magnetic, optical, electromagnetic, infrared, or semiconductor media. More specific examples of a suitable computer-readable medium would include, but are not limited to, magnetic tapes, magnetic floppy diskettes, magnetic hard drives, or compact discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Although the device, system, and method of the present disclosure is embodied in software or code executed by general purpose hardware as discussed above, as an alternative the device, system, and method may also be embodied in dedicated hardware or a combination of software/general purpose hardware and dedicated hardware. If embodied in dedicated hardware, the device or system can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, programmable gate arrays (PGA), field programmable gate arrays (FPGA), or other components, etc. Such technologies are generally well known by those skilled in the art and, consequently, are not described in detail herein.

It can be understood that all or part of the steps in the method of the above embodiments can be implemented by instructing related hardware via programs, the program may be stored in a computer readable storage medium, and the program includes one step or combinations of the steps of the method when the program is executed.

In addition, each functional unit in the present disclosure may be integrated in one progressing module, or each functional unit exists as an independent unit, or two or more functional units may be integrated in one module. The integrated module can be embodied in hardware, or software. If the integrated module is embodied in software and sold or used as an independent product, it can be stored in the computer readable storage medium.

The computer readable storage medium may be, but is not limited to, read-only memories, magnetic disks, or optical disks. Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A method for checking health of a link, comprising:
    receiving and saving control information generated by a keep-alive program, wherein the control information comprises a source Internet Protocol IP address, a source port, a destination IP address, a destination port, an IP address of a server to be checked, and mode information, wherein the mode information comprises a Direct Routing DR mode or a Tunnel TUN mode;
    performing a matching on a message received according to the control information, processing the message if the matching is successful, and sending a processed message to the server to be checked; and
    determining that the link is healthy if a response message is received from the server to be checked, and determining that the link is unhealthy if no response message is received from the server to be checked;
    wherein processing the message comprises:
    if the mode information is determined as the DR mode, amending a destination MAC address of the message to a MAC address of the server to be checked; and
    if the mode information is determined as the TUN mode, adding a TUNNEL head before the destination IP address of the message.

2. The method according to claim 1, wherein the source IP address and the source port are configured by the keep-alive program through calling a first preset function, and the destination IP address and the destination port are configured by the keep-alive program through calling a second preset function.

3. The method according to claim 1, wherein performing a matching on a message received according to the control information comprises:
    determining whether the matching is successful by determining whether the source IP address, the source port, the destination IP address, and the destination IP port in the control information are respectively identical with a source IP address, a source port, a destination IP address, and a destination IP port in the message received.

4. A device for checking health of a link, comprising:
    one or more processors configured to execute one or more software modules stored in a non-transitory storage medium, the one or more software modules including:
    a receiving module, configured to receive and save control information generated by a keepalive program, wherein the control information comprises a source Internet Protocol IP address, a source port, a destination IP address, a destination port, an IP address of a server to be checked, and mode information, wherein the mode information comprises a Direct Routing DR mode or a Tunnel TUN mode;

a processing module, configured to perform a matching on a message received according to the control information, process the message if the matching is successful, and send a processed message to the server to be checked; and a determining module, configured to determine that the link is healthy if a response message is received from the server to be checked, and to determine that the link is unhealthy if no response message is received from the server to be checked;

wherein the processing module is configured to:

amend a destination MAC address of the message to a MAC address of the server to be checked, if the mode information is determined as the DR mode; and add a TUNNEL head before the destination IP address of the message matched successfully, if the mode information is determined as the TUN mode.

5. The device according to claim 4, wherein the source IP address and the source port are configured by the keep-alive program through calling a first preset function, and the destination IP address and the destination port are configured by the keep-alive program through calling a second preset function.

6. The device according to claim 4, wherein the processing module is configured to:

determine whether the matching is successful by determining whether the source IP address, the source port, the destination IP address, and the destination IP port in the control information are respectively identical with a source IP address, a source port, a destination IP address, and a destination IP port in the message received.

* * * * *